United States Patent [19]

Haggerty

[11] Patent Number: 4,688,031
[45] Date of Patent: Aug. 18, 1987

[54] MONOCHROMATIC REPRESENTATION OF COLOR IMAGES

[75] Inventor: William T. Haggerty, Groton, Mass.

[73] Assignee: Wang Laboratories, Inc., Lowell, Mass.

[21] Appl. No.: 595,027

[22] Filed: Mar. 30, 1984

[51] Int. Cl.[4] .............................................. G09G 3/00
[52] U.S. Cl. .................................... 340/793; 340/703; 340/730; 358/283
[58] Field of Search ....................... 340/703, 793, 730; 358/22, 81, 283, 298; 350/162.12

[56] References Cited

U.S. PATENT DOCUMENTS

| | | | |
|---|---|---|---|
| 3,604,846 | 9/1971 | Behane | 358/298 |
| 3,983,319 | 9/1976 | Moe et al. | 358/298 |
| 4,084,259 | 4/1978 | Cahill et al. | 358/298 |
| 4,225,861 | 9/1980 | Langdon, Jr. et al. | 340/703 |
| 4,231,069 | 10/1980 | Wellendorf et al. | 358/283 |
| 4,257,070 | 3/1981 | Sommer et al. | 358/283 |
| 4,481,529 | 11/1984 | Kerling | 340/793 |
| 4,532,503 | 7/1985 | Pennebaker | 340/728 |

OTHER PUBLICATIONS

DeBry, Halftone Graphics Using Program Character Set, IBM Technical Disclosure Bulletin, vol. 20, No. 6, Nov. 1977.

*Primary Examiner*—Marshall M. Curtis
*Attorney, Agent, or Firm*—Michael H. Shanahan

[57] ABSTRACT

A color to monochromatic image transformation which transforms each color area of the original image into a corresponding area of a monochromatic image having a particular pattern of 'light' and 'dark' dots corresponding to and representing the original color of the area. The dot patterns are selected to provide both gray scale representations of the original colors and differing textural appearances for each color, so as to maximize the discrimination between the areas of the monochromatic image. The monochromatic dot patterns do not necessarily correspond exactly to the colors or gray scale values of the original colors, but are selected to provide visual impressions analogous to the visual impressions provided by the corresponding original colors.

A further feature of the dot arrays selected to represent various colors is that the patterns of dots are selected for each array so as to avoid the creation of artifacts, that is, the formation of accidental or incidental patterns and figures within a given array or at the junction or border between two arrays.

A yet further feature is the enhancement, during transformation, of the visual appearance of alphanumeric characters and symbols. The original background color of the character or symbol is transformed into a monochromatic color pattern mask dot pattern as previously described. The original character or symbol foreground color field, that is, the character or symbol itself, however, is either transformed into a dark (black) field if the background color was 'light' or into a light (white) field if the background color was 'dark'. In the latter case, the original foreground field is effectively discarded and the character or symbol appears as a light 'hole' in the 'dark' background field.

8 Claims, 14 Drawing Figures

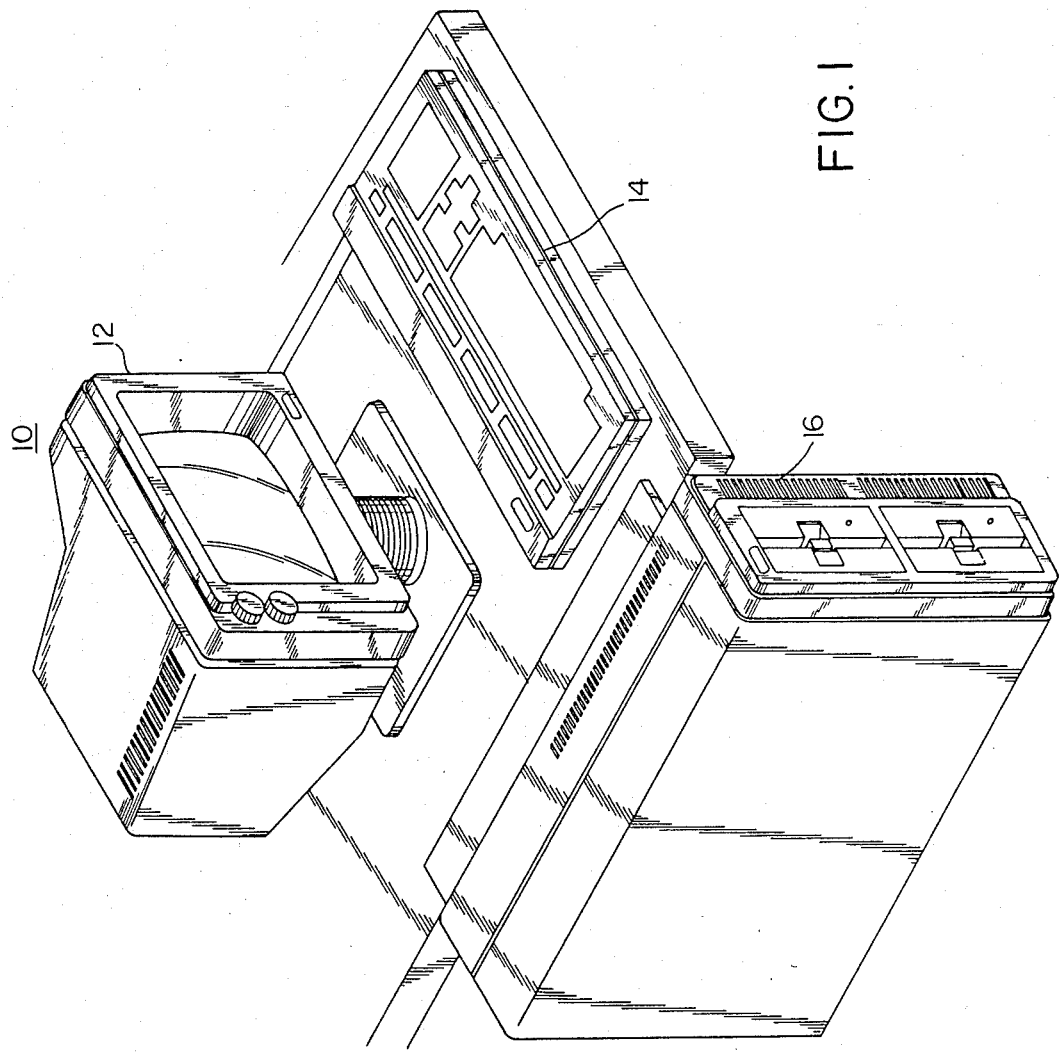

FIG. 4A

MONOCHROMATIC REPRESENTATION OF COLOR IMAGES

BACKGROUND OF THE INVENTION

1. Field of the Invention

The present invention relates to the processing and representation of color images and, more particularly, to a method and apparatus for the representation of color images in data processing systems having monochromatic output devices, such as printers and CRT displays. In this context, an image may be defined as a visual representation of information wherein the information may be pictorial or textual or both and may be comprised of alphanumeric characters or symbols or graphic characters, symbols or elements or a combination thereof. A color image may be further defined as an image wherein the elements or areas comprising the image, whether alphanumeric or graphic, are defined by various colors.

2. Prior Art

Many presently available data processing systems, ranging from public data base television type systems, such as PRESTEL, to 'home' computers to very expensive and complex computer aided design (CAD) systems, are capable of manipulating and representing monochromatic and color images. Many systems, however, are wholly or partially limited to monochromatic imagery, either for cost considerations or because image generation and display is a secondary or later added capability of the system. For example, a system may originally have been designed only for monochromatic operations or, while the system itself is capable of operating with color images, the display or hard copy devices connected from the system, such as the CRT and printers, may have only monochromatic capabilities. A recurring problem with systems having image capabilities is presented whenever color images, for example, generated or provided by a system having color image capabilities, are to be visually represented by a system having, for example, only a monochromatic CRT or monochromatic printers. In general, visual outputs of color images by monochromatic means have proven unsatisfactory, the images being esthetically unpleasing or in many cases visually distorted or transformed to an unacceptable extent.

One basis of the problem is that monochromatic and color processes differ in the information presented to a viewer in order for the viewer to distinguish between areas of an image. That is, color processes distinguish between various areas of an image by both color and shade of color, that is, the lightness or darkness of a color. For example, three areas may be distinguished in that one is red, one is light blue and one is dark blue; the red area is distinguished from the blue areas by color and the blue areas are distinguished by being of differing shades of blue. In monochromatic processes, however, the various areas of an image are distinguished only by shade, generally referred to as 'half tones', ranging from 'black' to 'white'.

A transformation of a color image to a monochromatic image thereby requires that color and shade information contained in a color image be transformed into shade information in a monochromatic image. This results, in present systems, in a loss or distortion of visual information. For example, in the simplest systems the 'dark' combinations of color and shade information from a color image are transformed into a 'black' monochromatic shade while the 'light' combinations are transformed into a 'white' monochromatic shade. The result can be a total distortion of the original color image and at least a loss of visual information and a degradation of visual esthetics.

In more complex systems, the various combinations of color and shade appearing in the color image original are transformed into their nearest equivalent 'gray scale' monochromatic shade. The most common example of such a system is in 'black and white' photography of a colored object, such as a landscape; that is, the various colors and shades appearing in the scene are replaced, in the photograph, by their shade of gray equivalents. While such a system provides less distortion than the simple system described above, there may still be some distortion of the original visual information and often a loss of esthetics. This distortion occurs because many combinations of color and shade have the same 'gray scale' equivalent; for example, a red area, a blue area and a green area, easily distinguishable in color, may have the same gray equivalent and appear as the same shade of gray in the monochromatic image.

It is thereby an object of the present invention to provide an improved method and apparatus for representing color images through monochromatic means.

SUMMARY OF THE INVENTION

The color to monochromatic image transformation of the present invention transforms each color area of the original image into a corresponding area of the monochromatic image having a particular pattern of 'light' and 'dark' dots, pixels or pels, hereafter referred to commonly as "dots", corresponding to and representing the original color of the area. The dot patterns are selected to provide both gray scale representations of the original colors and differing textural appearances for each color, so as to maximize the discrimination, or distinction, between the areas of the monochromatic image. That is, the transformation of the present invention provides an approximation to gray scale representation, in the overall gray scale appearance of the dot patterns, but adds an additional dimension of texture. It should be noted, in this regard, that the monochromatic dot patterns of the present invention do not necessarily correspond exactly to the colors or gray scale values of the original colors, but are selected to provide visual impressions analogous to the visual impressions provided by the corresponding original colors.

A further feature of the dot arrays selected to represent various colors is that the patterns of dots are selected for each array so as to avoid the creation of artifacts, that is, the formation of accidental or incidental patterns and figures within a given array or at the junction or border between two arrays.

A yet further feature of the present invention is the enhancement, during transformation, of the visual appearance of alphanumeric characters and symbols. The original background color of the character or symbol is transformed into a monochromatic color pattern mask pattern as previously described. The original character or symbol foreground color field, that is, the character or symbol itself, however, is either transformed into a dark (black) field if the background color was 'light' or into a light (white) field if the background color was 'dark'. In the latter case, the original foreground field is effectively discarded and the character or symbol appears as a light 'hole' in the 'dark' background field.

Other objects, advantages and features of the present invention will be understood by those of ordinary skill in the art after referring to the following detailed description of the invention and the drawings, wherein:

BRIEF DESCRIPTION OF THE DRAWINGS

FIG. 1 is an isometric view of a computer system incorporating the present invention;

FIGS. 4A and 4B are a representation of 8 by 8 color pattern masks for the colors black, red, green, yellow, blue, magenta, cyan and white;

DESCRIPTION OF A PREFERRED EMBODIMENT

Figure 2A:
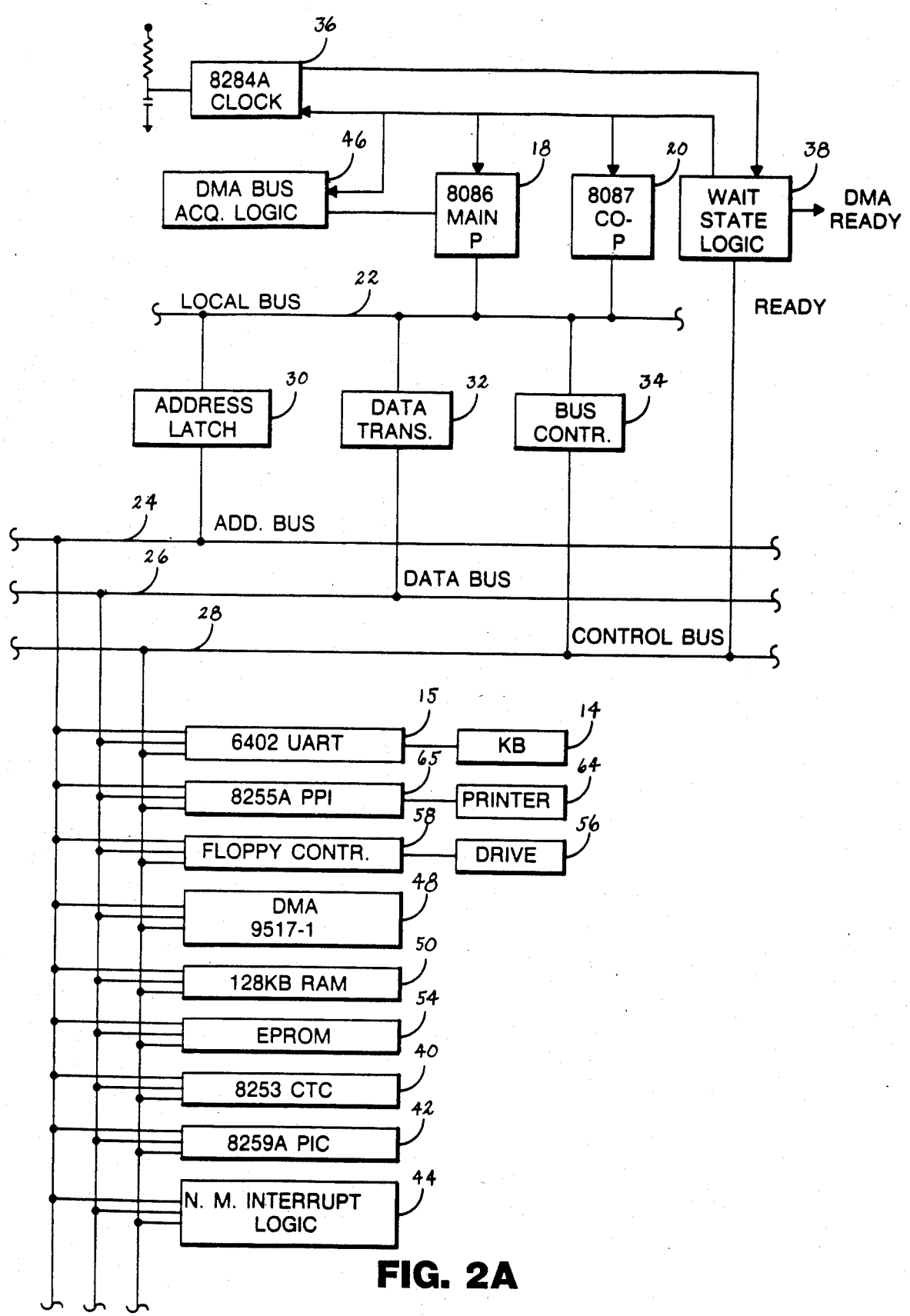
FIGS. 2A and 2B are a block diagram of the computer system of FIG. 1.

The following description will first briefly present the general structure and operation of the hardware and software of a computer system incorporating the present invention and capable of performing image processing and display operations and of communications operations, including communications of images. The structure and operation of such a system will be well understood, as presented herein, by one of ordinary skill in the art and further details of the structure and operation of such a system are presented in U.S. patent application Ser. No. 440,668, filed Nov. 10, 1982 and incorporated herein by reference. The specific system selected for illustrative purposes is a Wang "Professional Computer" available from Wang Laboratories, Inc., Lowell, Mass. 01851. Having presented a context, that is, apparatus in which to practice the invention, the color to monochromatic image transformation method of the present invention will then be described in detail.

The following will then describe an exemplary color image system which may be used as source of color images to be transformed by the above described data processing system. The color images and system described therein are representative of many other commonly used color image systems which may be sources of color images to a system as described above. Other sources of color images, such as color graphic computer systems may also serve as sources of color images, as may the exemplary system described in the present patent application. In the latter case, the color transformation of the present system may be used, for example, to transform a color image generated by a system when a monochromatic printer connected from the source system is used to provide a hard copy of images created therein.

By way of example of a presently preferred embodiment of the present invention, the color transformation of the present invention is described below as used in relation to a public data base television type system referred to as PRESTEL; PRESTEL is a trademark of the British Post Office for PRESTEL services. PRESTEL is presently used in Britain, for example, to selectively distribute, under viewer control, information of interest to the public from a central PRESTEL data base. The information contained in this data base may pertain, for example, to weather and stock market reports and shopping guides and entertainment guides. The information so provided is primarily in the form of color images containing both text, that is, alphanumeric characters and symbols, and graphic or pictorial elements. A copy of the current PRESTEL system specification, defining the interfaces, protocols and operation of the system is included in the present patent application as an appendix and is incorporated herein by reference.

The following will then describe in detail the color transformation system of the present invention with respect to the exemplary color system, and will then describe other applications of the present invention, including applications for other color graphics and image systems.

1. Computer System Structure and Operation

Referring to FIG. 1, an isometric view of the computer system is shown. System 10 includes a Display 12, a Keyboard 14 and a Central Processing Unit (CPU) 16. Display 12 and Keyboard 14 are the primary means by which information, for example, text, is communicated between the system and a user. CPU 16, which is connected to Display 12 and Keyboard 14 by cables which are not shown, includes a memory for storing programs and data and a general purpose arithmetic and logic unit (ALU). CPU 16 may further include disc drives for storing programs and data and interfaces to peripheral devices, such as printers, disc drives and telecommunications devices. As described above, System 10 may be comprised, for example, of a "Professional Computer" available from Wang Laboratories, Inc., Lowell, Mass. 01851.

A. Hardware Structure and Operation a. ALU and Busses

Figure 2B:
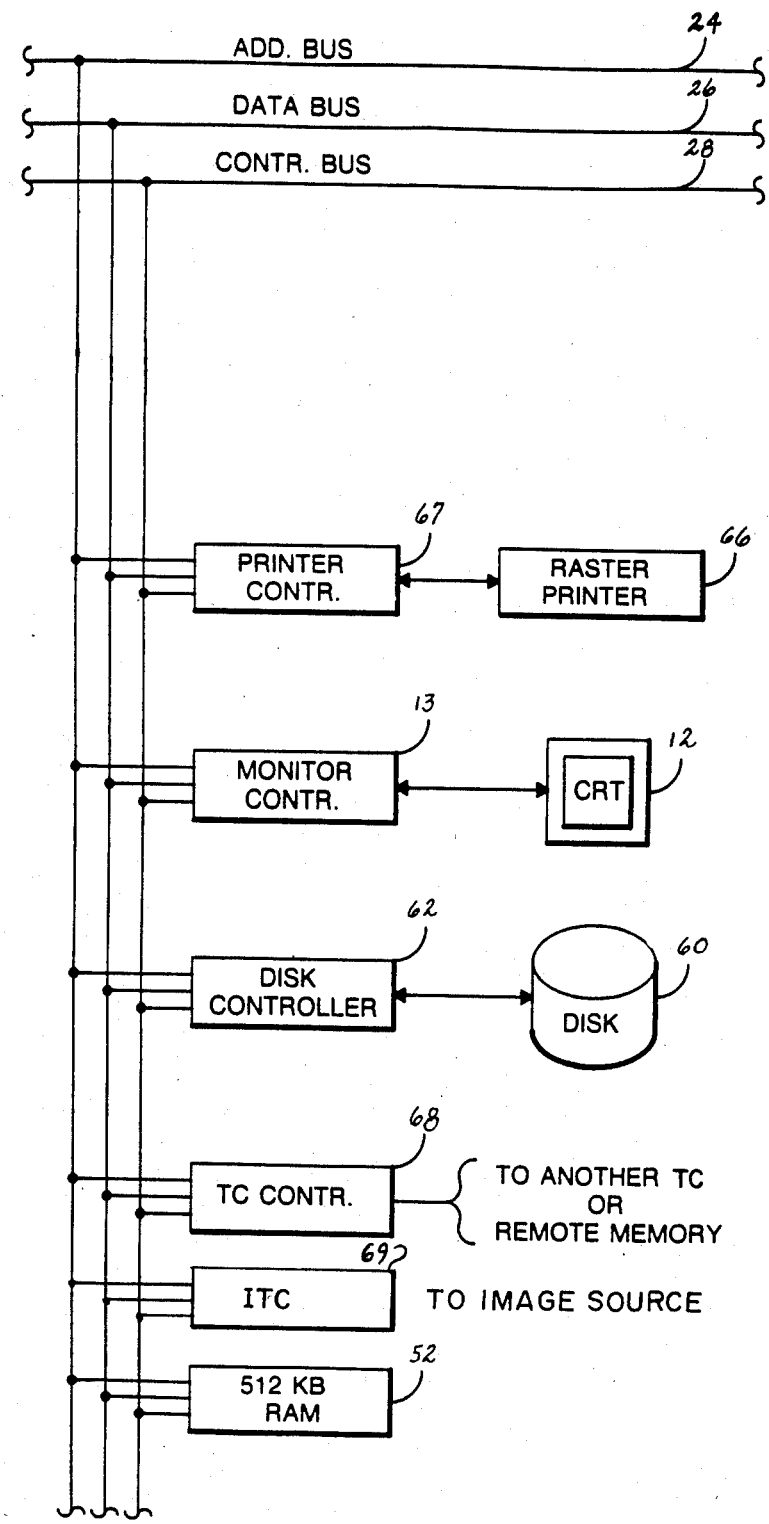

Referring to FIGS. 2A and 2B, a block diagram of System 10 is shown. System 10's ALU in CPU 16 is comprised of a Main Processor (Main P) 18 and a Co-Processor (CO-P) 20. Main P 18 and CO-P 20, may, for example, respectively be a 16 bit Intel 8086 ALU and an Intel 8087 numerics processor extension. Main P 18 and CO-P 20 perform all arithmetic and logic operations for CPU 16, including addressing, memory references, and control of Input/Output (I/O) operations.

Main P 18 and CO-P 20 communicate through Local Bus 22 and with the remainder of CPU 16, Display 12, Keyboard 14 and all peripheral devices through Address Bus 24, Data Bus 26 and Control Bus 28. The interface between Main P 18 and CO-P 20 and Busses 24, 26 and 28 is through Address Latch 30, Data Transceiver 32 and Bus Control 34.

b. Internal Control Logic

Referring next to CPU 16's internal control logic, associated with Main P 18 and CO-P 20 are System Clock 36 and Wait State Logic 38. System Clock 36 is the source of all clock timing signals for CPU 16. Wait State Logic 38 essentially monitors the operations of CPU 16 and issues control signals, to System Clock 36 and to other elements of CPU 16 through Control Bus 28, to prevent conflicts in CPU 16 operations.

Other of CPU 16's control elements include Counter and Timer Chip (CTC) 40 and Programmable Interrupt Chip (PIC) 42. CTC 40 may, for example, be an Intel 8253 and PIC an Intel 8255A. Non-Maskable Interrupt Logic 44 operates in conjunction with PIC 42 to handle interrupt conditions which must be handled immediately, that is, which cannot be masked for later action. Such interrupt conditions include parity and I/O errors.

CPU 16 is capable of performing both mapped memory references and Direct Memory Access (DMA) operations between CPU 16's memories, described below, and, for example, System 10's peripheral devices. DMA operations are controlled by DMA Bus Acquisition Logic 46 and DMA Control (DMA) 48. DMA Acquisition Logic 46 monitors the operation of System 10, in particular memory and bus operations, and issues DMA grant signals on Control Bus 28 when DMA operations may be executed. DMA 48 detects requests for DMA operations, for example, from peripheral devices, informs DMA Bus Acquisition Logic 46 of the presence of such requests, and controls DMA operations when DMA Bus Acquisition Logic 46 grants access to CPU 16's busses.

c. Memory

CPU 16's primary internal memory is 128 KB Random Access Memory (RAM) 50, which is used to store operating system and applications programs and data, such as images, to be operated upon. The operating system program may, for example, be comprised of the commercially available Micro Soft Disk Operation System from Micro Soft Corporation (note: MSDOS is a a tradename of Micro Soft Corporation) and may include the Basic Input and Output System (BIOS). MSDOS essentially controls the executive internal operations of System 10 while BIOS comprises programs controlling the interface between System 10. Display 12 and Keyboard 14 and a wide range of peripheral devices.

Where necessary, the capacity of 128 KB RAM 50 may be augmented by the addition of 512 KB RAM 52. 512 RAM 52 is connected from Address Bus 24, Data Bus 26 and Control Bus 28 in parallel with 128 KB RAM 50 and operates in parallel with and effectively as a part of 128 KB RAM 50.

Erasable Programmable Read Only Memory (EPROM) 54 stores and provides programs used to load the operating system and application programs described above from diskettes in Disc Drive 56 and into 128 KB RAM 50 and 512 KB RAM 52.

As indicated in FIG. 2A, Disc Drive 56 is connected from Address Bus 24. Data Bus 26 and Control Bus 28 and is controlled by Floppy Controller 58. In addition to storing and providing operating system and applications programs.

Disc Drive 56 may be used as additional memory capacity augmenting 128 KB RAM 50 and 512 KB RAM 52 and may be used to store and load data, such as text to be operated upon. In this regard, Disc Drive 56 may be used as an I/O device, for example, to transfer text or data from one system to another on diskette.

The capacity of Disc Drive 56 may be augmented by the addition of Winchester Hard Disc Drive 60 and Disc Controller 62, which are connected from Address Bus 24, Data Bus 26 and Control bus 28 in parallel with Disc Drive 56 and RAMs 50 and 52. Hard Disc Drive 56 may be used as an extension to RAMs 50 and 52, for storing programs and data to be operated upon.

d. I/O Devices

As previously described, Display 12 and Keyboard 14 are the primary I/O means for communication between System 10 and a user. Display 12 may be a conventional monochromatic CRT display connected to Address Bus 24, Data Bus 26 and Control Bus 28 through Monitor Control 13 and Monitor Control 13 may, for example, be a Nippon Electric Corporation uPD 7220 Graphic Data Controller. Alternately, Display 12 may be a color display in those system wherein color capability is desired and the appropiate software run and Monitor Control 13 would be a color monitor driver. In yet other alternatives. Monitor Control 13 may comprise either a 'character set graphics' display driver or a 'bit map' display driver, or both, as described further below. Keyboard 14 is a conventional keyboard having an internal microprocessor, for example a Zilog Z80, for controlling keyboard operation and data/control communications between Keyboard 14 and system Busses 24, 26 and 28 through Universal Asynchronous Receiver/Transmitter (UART) 15. Other I/O devices include Printers 64 and 66. Printer 64 may, for example, be a conventional daisy wheel or dot matrix type printer. Printer 66 may, for example, be a thermographic printer for graphics printing, such as a Microplot 80 available from Gulton Industries, Inc. of East Greenwich, R.I. 02818.

Finally, communication between System 10 and other systems or devices is provided through Telecommunications Controller (TC) 68. TC 68 is a microprocessor controlled interface device, incorporating, for example, a Zilog Corporation Z80 microprocessor and serial I/O chip, for communication between system busses 24, 26 and 28 and communications modems or external devices, such as memories and displays. In the alternative, and specifically in the exemplary system described below. System 10 may further include an Image Telecommunications Controller (ITC) 69 specifically for communications of image data. In the present example, ITC 69 may be a PRESTEL decoder for receiving PRESTEL images and, in other embodiments, may be decoders/receivers for other color image transmission systems. TC 68 may, of course, also be used to transmit and receive image data.

It should be noted that the System 10 described above is exemplary and that the image transformation method described below may be implemented, for example, on a variety of system architectures. The method may, for example, be implemented on a processor based upon Zilog Z80, Motorola MC68000, Intel 8080 or 80186, or National Semiconductor NS16000 microprocessors, upon a minicomputer or mainframe computer, or upon a word processor or communications processor. Having described the structure and operation of System 10's hardware, the software structure and operation of System 10 will be described next below.

B. Software Structure and Operation

Figure 3:
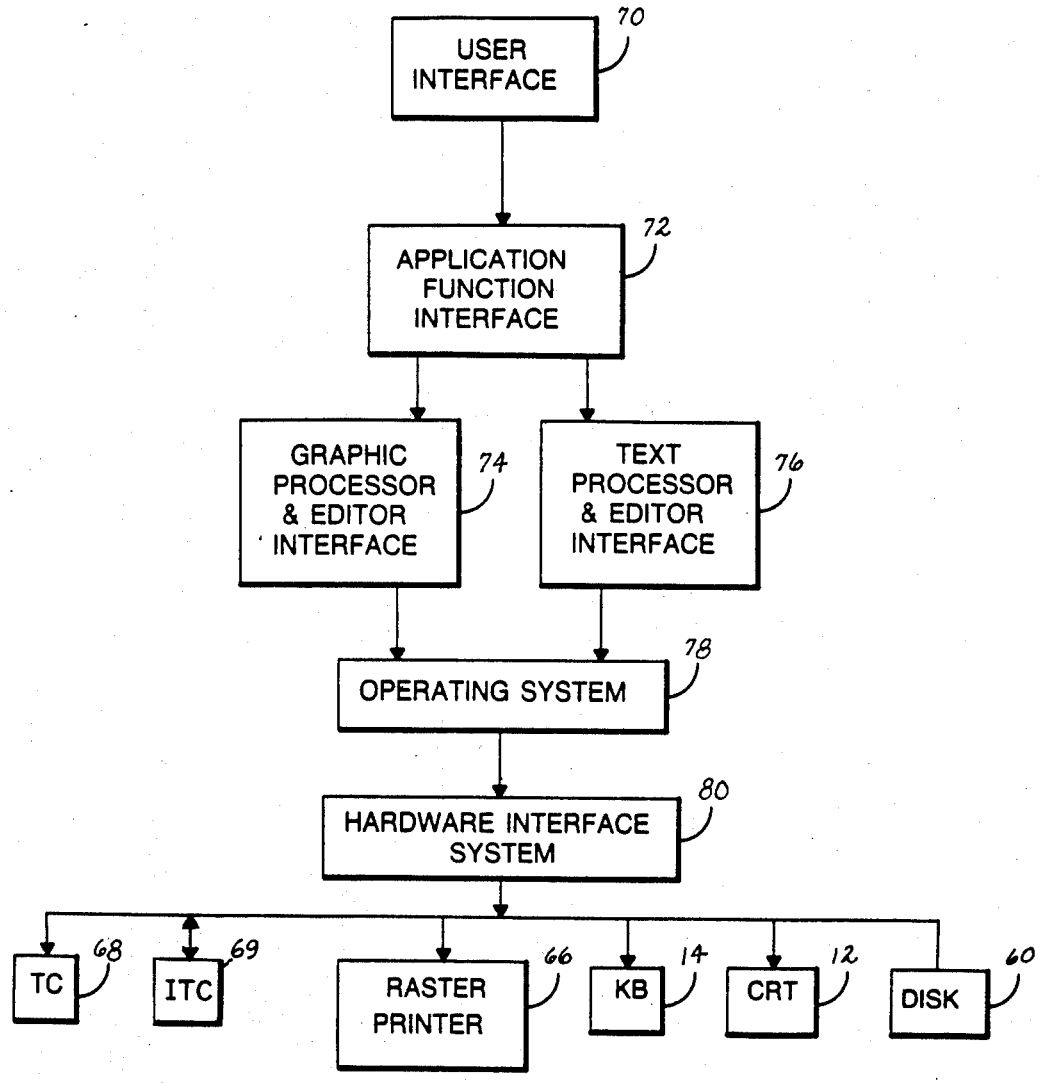
FIG. 3 is a diagrammic representation of the software structure of the computer system of FIGS. 1, 2A and 2B.

Referring to FIG. 3, a diagrammic representation of System 10's software structure is shown. As indicated therein, the system software structure is a multilayered structure for transforming user actions into specific, detailed operations by the system hardware. The software structure includes elements for interfacing with the user at the upper layers and with the system hardware elements at the lower layers. The middle layers essentially transform user commands and requests into instructions directing the operations of the hardware.

Beginning at the user interface level, routines 70, 72, 74 and 76 comprises the system's application programs and determine and direct the specific applications operations performed by the system, for example, image or graphics editing and display or data processing.

User Interface Routines 70 includes all routines for interacting with the user by means of, for example, Display 12, Keyboard 14 and the system discs and printers. While User Interface Routines 70 are oriented towards the user, Application Function Interface Routines 72 interface between the user action operations as performed by User Interface Routines 70 and the user action operations as performed by User Interface Routines 70 and the software which performs the actual applications operations, such as image editing and display. Essentially, Application Function Interface Routines 72 transform the results of the user interface operations into instructions and commands for directing the applications operations specified by the user.

Applications Routines 74 and 76 are the actual applications programs, that is, the programs directing the system to perform, for example, image or graphics editing or display operations or data processing operations. Applications Routines 74 and 76 receive direction for Application Function Interface Routines 72 regarding what operations have been requested by the user and provide instructions to Operating System 78 as to what system operations must be performed to execute the requested operations.

As previously described, Operating System 78 may be comprised of MSDOS and includes all routines necessary for executive control of the system. Operating System 78 in turn interfaces with Hardware Interface System 80, which is comprised of BIOS, previously described. Essentially, Operating System 78 determined what detailed operations must be performed by the system to carry out the operations requested by the user and provides corresponding instructions to Hardware Interface System 80. Hardware Interface System 80 in turn responds by providing detailed commands to the various elements, previously described, comprising System 10's hardware structure.

2. Color To Monochromatic Image Transformation

It should be noted for the purposes of the following descriptions that, in most systems. the various color areas of color images are essentially comprised of arrays of dots wherein each dot is of a particular color. The transformation of a color image into a monochromatic image is performed by replacing the color dot array in each area of the image with a corresponding dot array of monochromatic 'on' and 'off' dots.

As previously described, the color to monochromatic image transformation of the present invention transforms each color area of the original image into a corresponding area of the monochromatic image having a particular pattern of 'ligh' and 'dark' dots correspondng to and representing the original color of the area. The dot patterns are selected to provide both gray scale representations of the original colors and differing textural appearances for each color, so as to maximize the discrimination, or distinction, between the areas of the monochromatic image. That is, the transformation of the present invention provides an approximation to gray scale representation, in the overall gray scale appearance of the dot patterns, but adds an additional dimension of texture. It should be noted, in this regard, that the monochromatic dot patterns of the present invention do not necessarily correspond exactly to the colors or gray scale values of the original colors, but are selected to provide visual impressions analogous to the visual impressions provided by the corresponding original colors.

A further feature of the dot arrays selected to represent various colors is that the patterns of dots are selected for each array so as to avoid the creation of artifacts, that is, the formation of accidental or incidental patterns and figures within a given array or at the junction or border between two arrays.

It should be further noted, for the purposes of the following description, that in both color CRT and color printer type displays, the dots in a particular color area will be 'on' and of appropiate color to generate an area of the chosen shade of that color. The sole exceptions are for the colors 'black' and 'white'. In a CRT display, 'black' dots are usually represented by turning the 'black' dots 'off', so that the background color or the CRT screen is used as 'black', while 'white' dots are 'on'. In printers, 'white' dots are 'off', so that the natural color of the page is used as 'white', while 'black' dots are 'on' and result in the printing of a dot on a page. Monochromatic CRTs and printers, however, use combinations of 'on' and 'off' dots, that is, of dark and light dots, to provide various shades of 'gray' within given areas. The following descriptions will be based upon the conventions used in printers, that is, 'on' dots provide corresponding colored or 'dark' dots while 'off' dots provide corresponding 'white' or 'light' dots. The following invention is not limited, however, to printer systems, but is equally applicable to CRT type systems. In this regard, the transformation of the following descriptions from printer convention to CRT convention will be well understood by those of ordinary skill in the art.

The following will first describe an exemplary color image system which may be used as source of color images to be transformed by the above described data processing system. The color images and system described therein are representative of many other commonly used color image systems which may be sources of color images to a system as described above. Other sources of color images, such as color graphic computer systems may also serve as sources of color images, as may the system itself described above. In the latter case, the color transformation of the present system may be used, for example, to transform a color image generated by the system when a monochromatic printer connected from the system is used to provide a hard copy of images created therein.

The following will then describe in detail the color transformation system of the present invention with respect to the exemplary color system, and will then describe other applications of the present invention, including applications for other color graphics and image systems.

A. Exemplary Image Source Color System

By way of example of a presently preferred embodiment of the present invention, the color transformation of the present invention will be described below as used in relation to a public data base television type system referred to as PRESTEL; PRESTEL is a trademark of the British Post Office for PRESTEL services. PRESTEL is presently used in Britain, for example, to selectively distribute, under viewer control, information of interest to the public from a central PRESTEL data base. The information contained in this data base may pertain, for example, to weather and stock market reports and shopping guides and entertainment guides. The information so provided is primarily in the form of color images containing both text, that is, alphanumeric characters and symbols, and graphic or pictorial elements. A copy of the current PRESTEL system specification, defining the interfaces, protocols and operation of the system is included in the present patent application file as an appendix and is incorporated herein by reference.

The PRESTEL system uses character set graphics to create images. That is, each image is comprised of an array of 'characters' wherein each character is comprised of an alphanumeric character or symbol or a graphic symbol, the graphic symbols being used as 'building blocks' to create pictorial or graphic images or portions of images. A typical image may be comprised, for example, of a 40 character wide by 24 character high array and may include both alphanumeric and graphic characters in any arrangement.

A single character, in turn, is comprised of an array of dots and may typically be, for example, 8 dots wide by 8 dots high or 20 dots wide by 16 dots high. In the PRESTEL convention, which is common in character set graphic systems, certain dots of a character are 'on' to represent the "foreground" portions of the symbol represented by the character while the dots which are 'off' represent the "background" portions of the symbol. The library of characters, alphanumeric, symbolic and graphic, which may be used to create an image in the PRESTEL system are shown in TABLE 2A of the noted PRESTEL Appendix.

As indicated in the PRESTEL specification, an image is transmitted from the supplier data base to a user in the form of a sequence of 'character codes', which may be control codes, alphanumeric symbol characters or graphic characters and are decoded by the receiver to generate the color image. Within the information contained therein is information defining, for each character position, the colors of the foreground and background portions of the character to be displayed there.

B. Image Generation to Screen or Printer

The most common image display devices, for example, CRT displays and printers, are dot matrix devices; that is, an image is written onto the screen or page as rows of dots and in many printers, the dots are written onto the screen or page in a raster scan manner, that is, the dots are written one row at a time. In certain dot matrix printers, however, blocks of dots may be printed as entities, that is, as complete characters in character set graphics systems. Yet other printers print in the form of 8 dot columns, the columns then comprising the image.

The systems which generate and provide the images to the display devices are usually either character set systems, such as PRESTEL, or bit mapped systems, or graphic systems, or a combination thereof. In character set systems, the image is usually stored in memory in the form of character codes, as described above with reference to PRESTEL, wherein a particular block of character codes defines a corresponding row of characters appearing in an image. In certain printers, for example, the symbol character codes defining the image are used to generate corresponding printer codes driving the printer, which performs a symbol code to image conversion. In the present invention, the conversion between received symbol codes and display device image will at least include a conversion, as described below, from color representation to monochromatic representation.

In the case of raster scan CRTs and printers, each such block of codes defines a plurality of rows of dots in the displayed image. For example, as described above to reference with PRESTEL, each character of the character set may be an 8 by 8 array of dots and an image row of characters is thereby comprised of 8 raster scan lines of dots. The character codes for a single row of characters is thereby read 8 times to generate, to the CRT screen or printer, the corresponding 8 rows of dots comprising the corresponding characters of that row. In this case, the conversion from color representation to monochromatic representation of the present invention may be performed concurrently with the reading of character codes into corresponding pluralities of rows of displayed dots.

In bit mapped systems, the image to be displayed is stored in memory in the same form in which it appears on a CRT screen or on a printer page, that is, effectively as rows and columns of dots. In a monochromatic system, the image information stored in memory may be comprised of singe binary 'bits' corresponding to 'on' and off dots. In a color system, each stored dot will be in the form of a binary 'word', for example, of 2, 4, 8 or more bits and will include information as to both whether the corresponding dot is 'on' or 'off' and the color of the corresponding dot. In either case, the image information stored in memory is scanned and read to the CRT or printer directly, that is, as one displayed row of dots at a time.

Bit mapped images may be generated and transmitted between systems directly, or as character set graphic images and subsequently transformed into bit mapped images. In the first case, where the image originally exists as a bit mapped image, the transformation between color and monochromatic representation of the present invention may be performed either as the image is being scanned to a CRT or printer, or upon the image as stored in memory.

Finally, in graphic systems, the images are defined by instructions specifying the boundaries of geometry elements appearing therein. In some systems, the instructions define colors with which the elements are to be 'filled'.

In the case of an original character set graphics image, the transformation may be performed either as the image is transformed into a bit mapped image, or as just described with reference to an image originally created in bit mapped form.

3. Monochromatic Representation of Color

As previously described, the color to monochromatic image transformation of the present invention transforms each color area of the original image into a corresponding area of the monochromatic image having a particular pattern of 'light' and 'dark' dots corresponding to and representing the original color of the area. The dot patterns are selected to provide both gray scale representations of the original colors and differing textural appearances for each color, so as to maximize the discrimination, or distinction, between the areas of the monochromatic image. That is, the transformation of the present invention provides an approximation to gray scale representation, in the overall gray scale appearance of the dot patterns, but adds an additional dimension of texture. It should be noted, in this regard, that the monochromatic dot patterns of the present invention do not necessarily correspond exactly to the colors or gray scale values of the original colors, but are selected to provide visual impressions analogous to the visual impressions provided by the corresponding original colors.

Also as previously described, a further feature of the dot arrays selected to represent various colors is that the patterns of dots are selected for each array so as to avoid the creation of artifacts, that is, the formation of accidental or incidental patterns and figures within a given array or at the junction or border between two arrays.

Again as previously described, the various color areas of color images are essentially comprised of arrays of dots wherein each dot is of a particular color. The transformation of a color image into a monochromatic image is performed by replacing the color dot array in each area of the color image with the corresponding dot array, or color pattern mask, of monochromatic 'on' and 'off' dots.

Figure 4A:
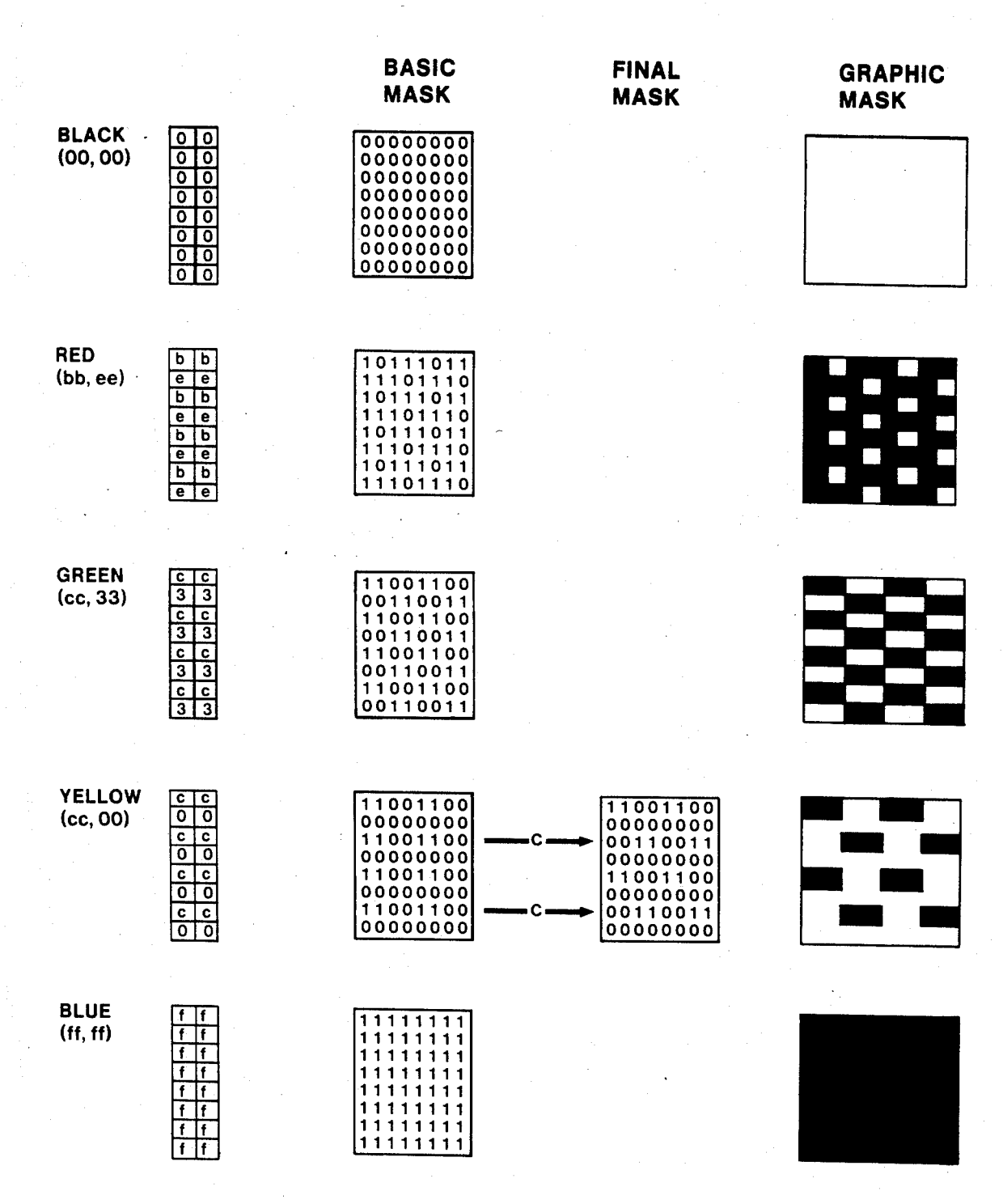
Figure 4B:
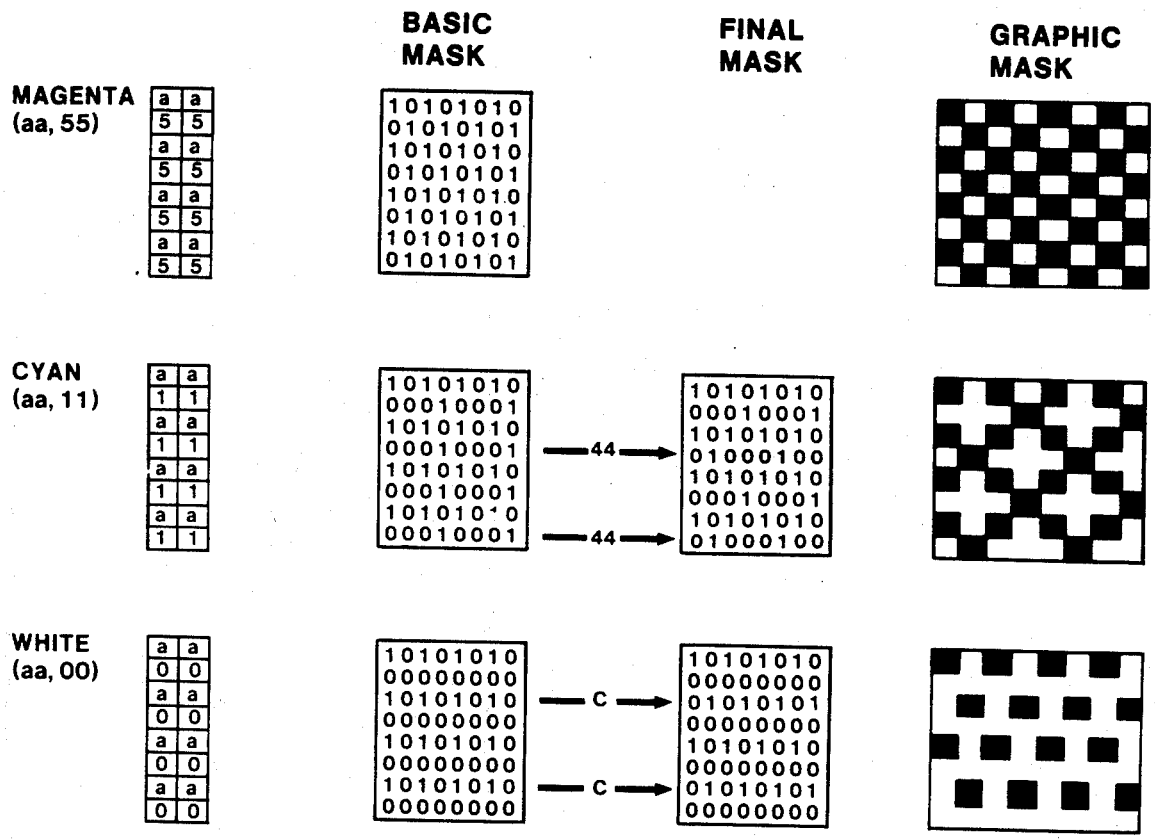

Referring to FIGS. 4A and 4B, the monochromatic dot arrays, or color pattern masks, for the colors black, red, green, yellow, blue, magneta, cyan and white for 8 by 8 arrays are shown. Each array is in three forms, as a hexidecimal representation of the array, as a binary bit pattern, and as an array of dark and light dots. In the present application, an 'on' dot corresponds to a binary "1" bit and is represented as a darkened dot while an 'off' dot corresponds to a binary "0" and is represented by a light dot. As previously described, this convention was selected as corresponding to the monochromatic printout provided by a printer, wherein a "1" or 'on' dot of a dot matrix provides a printed dot on a page and a "0" or 'off' dot is not printed and provides a light dot. In a representation for a CRT display, the light and dark dot arrays could be reversed; that is, an 'on' or "1" dot would provide a light dot on the screen while an 'off' or "0" dot would be a dark dot.

Referring first to the hexidecimal representations of the dot arrays, that is, color pattern masks, each hexidecimal representation of an array contains four hexidecimal characters, for example, the color pattern mask for magenta is represented by (aa,55). As is well known, a single hexidecimal character represents a four bit binary number; for example, 'a' represents the binary number 1010, or 10, while 5 represents 0101, or 5. Two hexidecimal characters are thereby sufficient to represent one 8 dot row of a color pattern mask.

Each color pattern mask in FIGS. 4A and 4B is represented by two pairs of characters separated by a comma. The leftmost pair, for example, aa, represents the 8 bits of all even numbered rows of the color pattern mask, for example, rows 0, 2, 4, 6 and 8, counting from the top, while the rightmost pair, 55, represents the 8 bits of the odd numbered rows, for example, 1, 3, 5 and 7. Thus the even numbered rows of the color pattern mask for magenta will be comprised of the bit pattern 10101010 and the odd numbered row will be comprised of the pattern 01010101.

As described above, each color pattern mask for the colors shown is then shown in binary bit form, and finally as a color pattern mask of light and dark dots.

Finally, it should be noted that the dot pattern of certain rows of certain color pattern masks have been further modified. In particular the 2nd and 7th rows of yellow and white are modified by complementing the bits in the basic pattern and the 3rd and 8th rows of cyan have had the pattern (44) substituted for the original pattern. This modification is performed to result in the final dot patterns of the color pattern masks shown in the rightmost column for each of these colors. The color pattern masks for yellow, cyan and white are created in this manner because, in certain systems, it is most convenient and efficient to store and operate with color pattern masks represented in a uniform format, for example, a matrix of hexidecimal numbers. The modifications to provide the final color pattern masks may then be performed in conjunction with the transformation of the color images. For example, in a character set graphics system wherein the color transformation is performed a scan row at a time, the row (44) is read for the 3rd and 8th rows of the cyan color pattern mask, rather than the (11) or (aa) stored in the color pattern mask matrix, and the bits of the 2nd and 7th rows of the yellow and white color pattern masks are complemented as the 2nd and 7th rows are read from the color pattern mask matrix.

Referring to FIGS. 5A, 5B and 5C, 20 by 16 color pattern masks for the same set of colors are shown in the same manner as in FIGS. 4A and 4B. It should first be noted that in this case the hexidecimal representations of the color pattern masks are again comprised of two sets of hexidecimal characters separated by a semicolon, the left set representing even numbered rows of the color pattern mask and the right set representing the odd numbered rows. Each set is comprised of 6 hexidecimal characters divided into three pairs of hexidecimal characters, each pair representing 8 bits, or one byte, of the row dot pattern. Although the masks are 20 dots wide, most systems prefer to operate with whole bytes or pairs of nibbles, that is, half bytes; as such, the hexidecimal representations of the rows contain information for 24 bits, or dots, that is, three bytes. It should be noted, however, that in the hexidecimal representations of each mask the last hexidecimal character, or last for bits or dots, of each row representation are set to hexidecimal 0, that is, the bit pattern 0000. These portions of the hexidecimal representation information are not used in generating the color pattern masks or in transforming colors into monochromatic dot patterns, so that the color pattern masks are effectively 20 dots wide.

It should be further noted that the 20 by 16 color pattern mask dot patterns differ from the 8 by 8 color pattern mask dot patterns, although providing the same analogous color representations as is achieved by the 8 by 8 color pattern masks. This difference is provided to allow color representation to be achieved in printers having a 20 by 16 dot character capability and in printers which print in a 'double density' mode. In the double density mode, the characters, images or color pattern masks are effectively compressed by a factor of two in the horizontal axis when printed. That is, the second column of a character is printed a partial column separation from the first column to comprise the first printed column, the fourth column of the character is printed a partial comumn separation from the third column to comprise the second printed column, and so on.

Having described the monochromatic color pattern masks used in the present invention to provide monochromatic representation of color, the method by which those color pattern masks are used in transforming color images into monochromatic images is printed next below. The example selected is, again, for a character set graphics system such as PRESTEL.

4. Transformation of Color Images to Monochromatic Images

Figure 6:
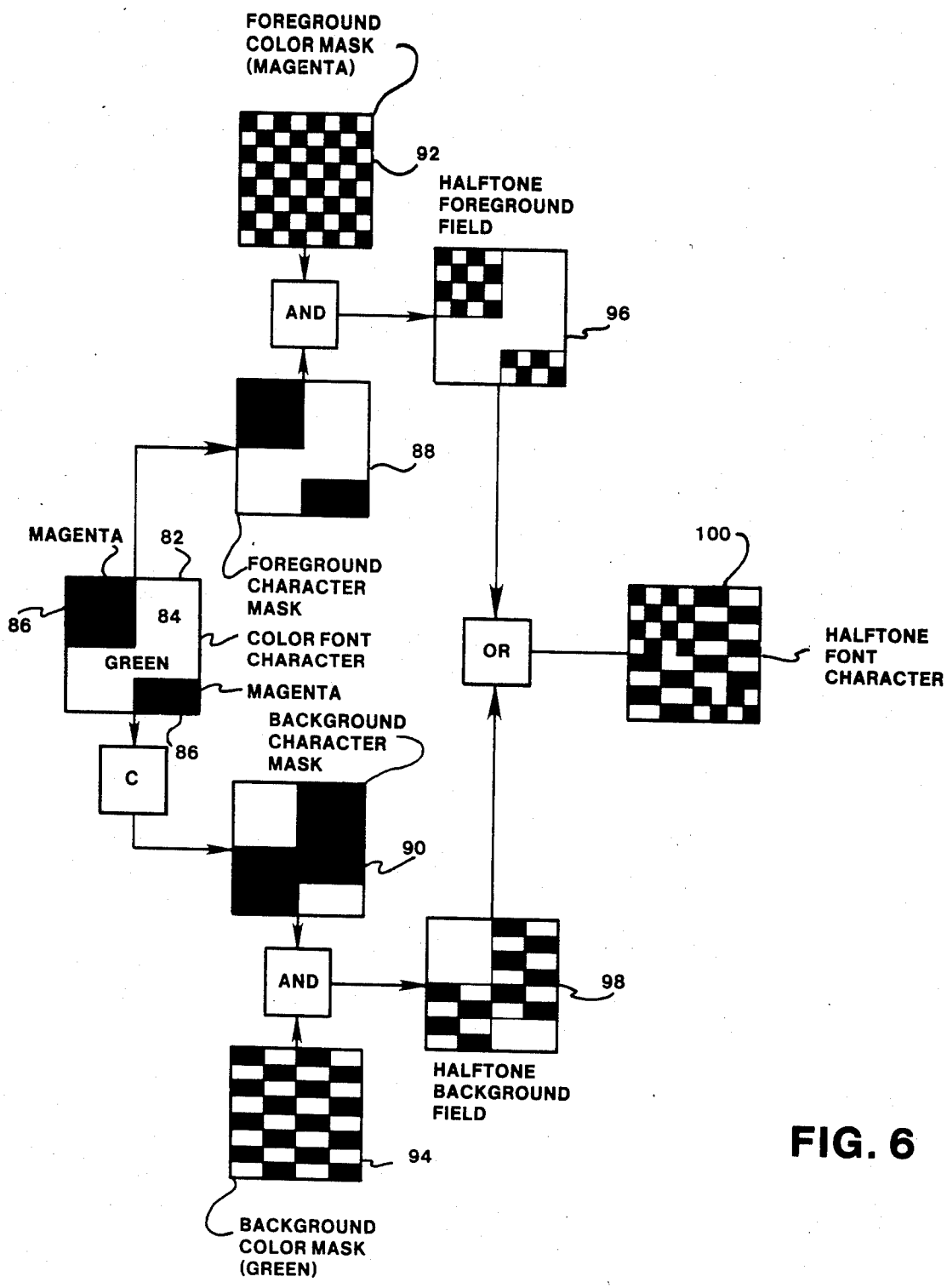
FIG. 6 is a diagrammic illustration of the color to monochromatic image transformation method of the present invention.

As described above, the transformation of a color image into a monochromatic image is performed by replacing the color in each area of the color image with the monochromatic dot pattern of the corresponding color pattern mask described above. The image transformation process is illustrated in FIG. 6, using a graphic symbol as an example. As previously described, the convention is followed in the present application of indicating 'on' dots as dark dots and 'off' dots as light dots as would result from a printed image, the "dots" being shown as unit squares in the character and mask arrays. Also as previously described, this convention could be reversed for the case of a CRT display. The process may be executed in a similar manner for all symbols or alphanumeric characters and for any color pattern mask or font character size or proportions, the present illustration being exemplary only.

Referring to FIG. 6, the symbol to be transformed, referred to as Color Font Character (CFC) 82, is shown as comprised of an 8 by 8 array wherein the Background Field (BF) 84 color is green and the Foreground Field (FF) 86 is comprised of a 4 by 4 magenta square in the upper left corner and a 2 by 4 magenta rectangle in the lower right corner.

In the first step of the process, foreground and background character masks are generated, the foreground character mask representing the area of foreground color (magenta) by its 'on' dots and the background character mask representing the area of background color (green) by its 'on' dots. In this step, CFC 82 is used directly to comprise Foreground Character Mask (FCHM) 88 while CFC 82 is complemented (C) to generate Background Character Mask (BCHM) 90. In FCHM 88 and BCHM 90 the 'on', or dark dots, represent those portions of the original image CFC 82 which were occupied by respectively by the foreground and background colors.

FCHM 88 and BCHM thereby respectively represent those portions of the original image CFC 82 which were occupied by respectively the foreground and background colors.

In the second step of the process, FCHM 88 and BCHM 90 are logically ANDed, dot by dot, with, respectively. Foreground Color Pattern Mask (FCOM) 92 and Background Color Pattern Mask (BCOM) 94 to generate respectively Halftone Foreground Field (HFF) 96 and Halftone Background Field (HBF) 98. FCOM 92 and BCOM 94 are selected from the library of color pattern masks previously described with reference to FIGS. 4A and 4B and FIGS. 5A, 5B and 5C.

HFF 96 and HBF 98 represent, respectively, the foreground and background color areas of the original CFC 82, but with the foreground and background areas filled in with, or transformed, to contain the color pattern mask dot patterns corresponding respectively to the original foreground and background colors.

In the final step of the process, HFF 96 and HBF 98 are logically ORed, dot by dot, to generate Halftone Font Character (HFC) 100. HFC 100 is identical to original CFC 82, but with the original foreground and background colors of CFC 82 replaced, or transformed into, the bit patterns of the corresponding color pattern mask dot patterns. HFC 100 is thereby the monochromatic equivalent, in terms of visual impression, of color image CFC 82.

The above description of the color to monochromatic transformation of a character of an image has been illustrated in FIG. 6 in a graphic manner. In most systems, the transformation will be performed in a raster scan manner, one raster scan line at a time.

To illustrate, the original image may, for example, be comprised of 24 rows of characters similar to CFC 82 with each row containing 40 such characters and each character comprised of an 8 by 8 array of dots of foreground and background color. In a scan line operation, the top row of each of the characters in the top row of the image would be read in sequence a dot or group of dots at a time, and used directly or in complemented form a dot at a time as the FCHMs 88 and BCHMs 90 of the top row of dots of the image. These dot by dot FCHMs 88 and BCHMs 90 would be dot by dot logically ANDed with the top row of dots of the appropiate FCOMs 92 and BCOMs 94 for each color to generate, dot by dot, the top row of the corresponding HFFs 96 and HBFs 98 which would, again dot by dot, be ORed to generate, a bit at a time, the top row of the HFCs 100 of the final monochromatic image.

This operation would be repeated for each row of dots of each row of characters, using the appropiate rows of the color pattern masks, until the entire image is transformed. To illustrate for a single character, and using the example of FIG. 6, the dot by dot representation of the top row of FCHM 88 and BCHM 90 are respectively, 11110000 and 00001111 while the dot by dot representation of the top rows of FCOM 92 and BCOM 94 are, respectively, 10101010 (aa) and 11001100 (cc). FCHM 88 top row is bit by bit ANDed with FCOM 92 top row to create HFF 96 top row 10100000 and BCHM 90 top row ANDed with BCOM 94 top row to create HBF 98 top row 00001100, which are ORed to create HFC 100 top row 10101100. For the second row of the character, FCHM 88 and BCHM 90 are respectively again 11110000 and 00001111 while the second rows of FCOM 92 and BCOM 94 are respectively 01010101 (55) and 00110011 (33). The second rows of HFF 96 and HBF 98 are respectively 01010000 and 00000011 and the second row of HFC 100 is 01010011, and so on until the image is completed.

It should be noted that, as previously described, certain rows of certain color pattern masks are modified from the dot patterns expressed in the hexidecimal matrix representations of the color pattern masks. For example, dot patterns of the 3rd and 7th rows of the cyan color pattern mask, that is, the 4th and 8th rows counting from the top row, are expressed as (44) rather than the (11) entered in the matrix representations. In such cases, the pattern 01000100 (44) would be used at this row in the transformation, rather than the matrix expression (11).

Figure 5A:
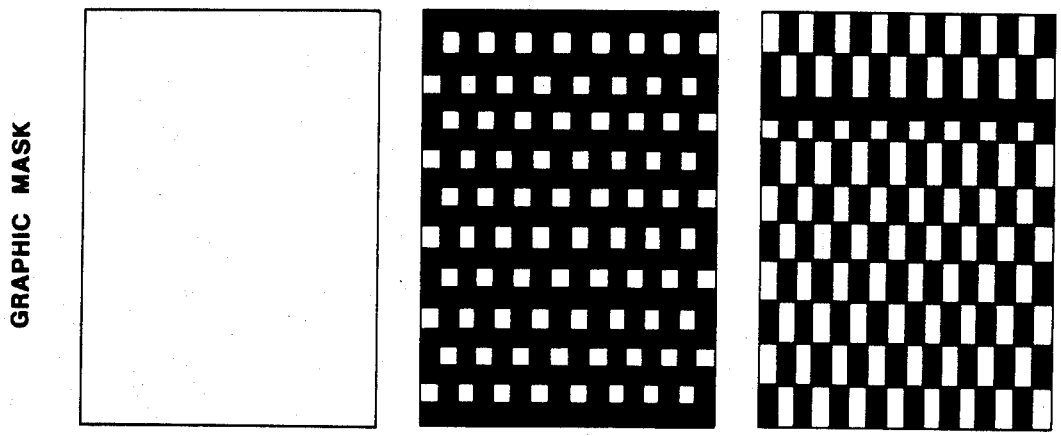
FIGS. 5A, 5B and 5C are a representation of 20 by 16 color pattern masks for the colors black, red, green, yellow, blue, magenta, cyan and white.
Figure 5B:
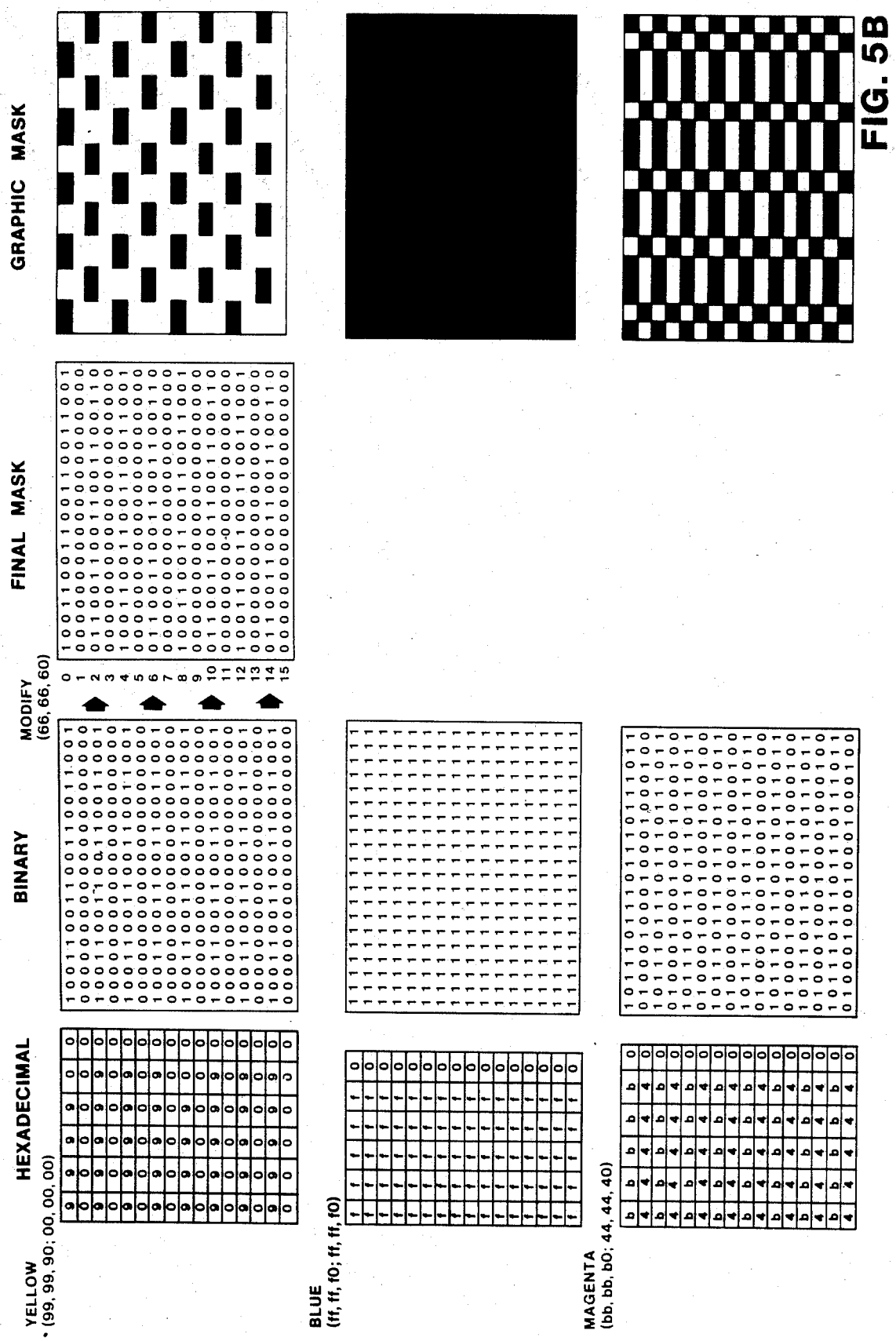
Figure 5C:
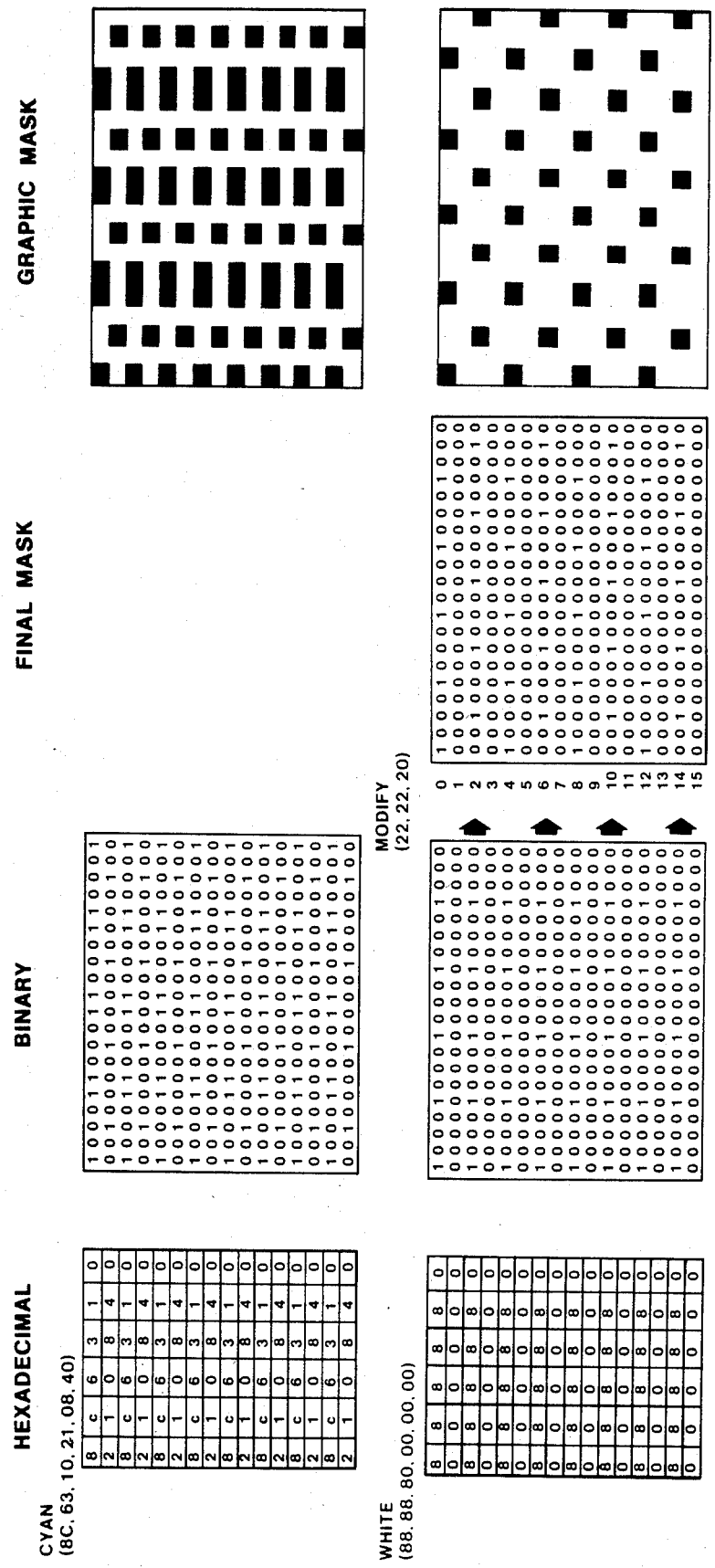

The above described transformation process would, of course, be executed in a similar manner for a character set graphics system using, for example, 20 by 16 dot character arrays and would use the color pattern masks described with reference to FIGS. 5A, 5B and 5C. Similarly, suitable color pattern masks may be generated on the basis described in the present invention for systems using any preferred character set array size.

As previously described, non-character set systems may contain images in the form of bit mapped color images. If the image is already present as a bit mapped image, it is possible, for example, to generate color pattern masks wherein each color pattern mask is the full image size. In this case, a group of FCHMs 88 or BCHMs 90 would be generated from the original image, each corresponding to one color in the original image and being of full image size; that is, each full image character mask would contain, for the corresponding color, 'on' dots in those image bit locations containing the corresponding color. The individual full image character masks would then by ANDed with the corresponding full image color pattern masks to generate corresponding full image halftone fore and background fields, which in turn would be ORed to generate the final halftone image.

If, however, the bit mapped image were originally present or available in the form of numeric expressions, that is, in a manner similar to the hexidecimal matrix representation of the color pattern masks, the transformation could be performed in a row by row and dot by dot manner similar to that described with reference to FIG. 6.

In yet other systems, for example the system described in the North American Presentation-Level-Protocol Syntax available from the American National Standards Institute, images may be defined in terms of the boundaries of geometric areas and the colors to be 'filled' therein. In such systems, the color to monochromatic transformation may be performed by using color pattern masks as presented herein to 'fill' within the area boundaries, rather than the originally defined colors.

Having described the color to monochromatic image transformation method of the present invention, a further method for enhancing the presentation of alphanumeric characters and symbols within an image will be presented next below.

5. Enhancement of Alphanumeric Characters and Symbols In An Image

Alphanumeric characters and symbols are commonly incorporated into images and, for example in color images, the foreground colors, that is, of the characters and symbols, and the background colors, upon which the characters and symbols appear, are usually selected for legibility as well as for appearance. As described above, however, the transformation of color images into monochromatic images results in a loss of certain image information and characters and symbols may become difficult to read. For example, in the method of the present invention, the various colors of an image are not replaced by a pattern having a 'gray scale' shade necessarily related to the 'gray scale' shade of the original color but by patterns, or textures, which provide, for the image as a whole, an analogous visual impression in maximizing discrimination between the areas of the image. As such, characters and symbols which are sufficiently distinct in the original colors may not be sufficiently distinct in the transformed monochromatic image. In other cases, the characters and symbols may not be sufficiently distinct in the original image. It may, therefore, be desirable to enhance the visual appearance of the characters and symbols in the monochromatic image, for example, to enhance legibility. Such enhancement essentially requires that the foreground of the character or symbol, that is, the character or symbol itself, be presented so as to be sufficiently distinct from its background.

Figure 7:
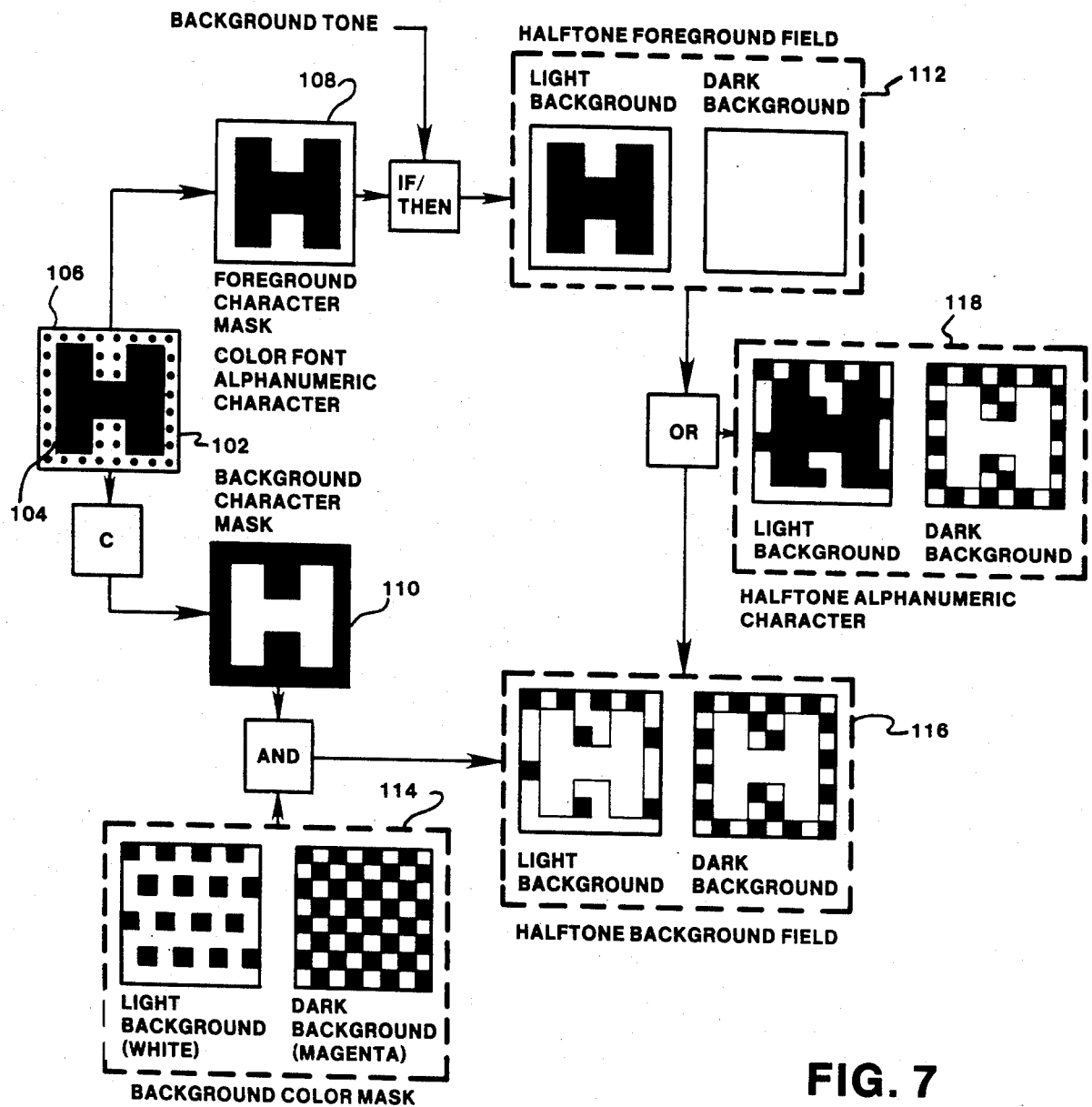
FIG. 7 is a diagrammic illustration of the character enhancement method of the the present invention; and, FIGS. 8A, 8B and 8C are illustrative representations of a color image transformed into a monochromatic image by the method of the present invention with, respectively, 8 by 8 arrays, 20 by 16 arrays and with enhancement of alphanumeric characters.

Referring to FIG. 7, the method of the present invention for enhancing the appearance of alphanumeric characters or symbols in transforming color images into monochromatic images is illustrated and is similar to the transformation process illustrated with reference to FIG. 6.

An initial Color Font Alphanumeric Character (CFAC) 102 is shown therein as, for example, the letter H 104 in a foreground color appearing upon a background of a different color represented by a dotted field 106. As in the previously described image transformation process, CFAC 102, that is, H 104, is used directly to provide Foreground Character Mask (FCHM) 108 and CFAC 102 is complemented (C) to generate Background Character Mask (BCHM) 110.

As previously described, the next step in the process is to generate, from FCHM 108 and BCHM 110, the halftone fore and background fields. As described below, the generation of the halftone fore and background fields, and in particular the halftone foreground field, is dependent upon the final appearance, or visual qualities, of the background field of the final halftone font character or symbol. The appearance of the halftone background field of the final character or symbol is determined by the particular color pattern mask used to create the halftone background field, which in turn depends upon the original color of the background field 106 of CFAC 102.

For purposes of generating the halftone foreground field, the range of halftone background fields, that is, the color pattern masks used to generate the halftone background fields, is divided into 'light' and 'dark' colors. In this case, however, 'light' and 'dark' refer to the patterns of the color pattern masks, rather than to the lightness or darkness of the original colors to which the color pattern masks correspond.

For example, and referring to the color pattern masks shown in FIGS. 4A and 4B, original colors black, yellow, cyan and white are referred to as 'light' colors because the color masks corresponding to these colors contain a majority of light dots in their patterns and thereby provide a light overall tone. The masks for colors red, green, blue and magenta contain a majority of dark dots in their patterns and provide a darker overall tone, so that these colors and color masks are referred to as 'dark' colors. The process illustrated in FIG. 7 contains example for both 'light' and 'dark' original background colors.

The generation of Halftone Foreground Field (HFF) 112 depends, as just described, upon whether Background Color Mask (BCM) 114 is for a 'dark' background color, for example, magenta, or for a 'light' background color, for example, white. If BCM 114 is for a 'light' background color, FCHM 108 is used directly as HFF 112. In the example, HFF 112 contains 'on' dots in the pattern corresponding to the foreground color H 104 of CFAC 102; that is, HFF 112 is the original character or symbol. In the case of an output to a printer, therefore, the original character or symbol foreground field 104 will be printed as a 'dark' foreground field. If BCM 114 is for a 'dark' background color, all dots in HFF 112 are set 'off'; that is, there are no foreground dots in HFF 112 and the foreground field is effectively deleted, or made a 'null' field. In the case of a printer, the character or symbol foreground field 104 would therefore appear as a 'light' foreground field.

The generation of Halftone Background Field (HBF) 116 is performed as previously described. That is, BCHM 110 is dot by dot ANDed with a Background Color Mask (BCM) 114 corresponding to the color of the background field 106 of CFAC 102. The resulting HBF 116 for both 'light' and 'dark' original background colors is shown in the example illustrated in FIG. 7.

As in the previously described transformation process, HFF 112 and HBF 116 are then ORed to provide the final Halftone Alphanumeric Character (HAC) 118. If the original color background was a 'light' color, then the character or symbol will appear as a 'dark' character or symbol on a 'light' background field pattern. If the original background color was a 'dark' color, the character or symbol will appear as a 'light' character or symbol on a 'dark' background field pattern.

To summarize, in the enhancing transformation of alphanumeric characters and symbols, the original background color of the character or symbol is transformed into a monochromatic color pattern mask as previously described. The original character or symbol foreground color field, that is, the character or symbol itself, however, is either transformed into a 'dark' (black) field if the background color was 'light' or into a 'light' (white) field if the background color was 'dark'. In the latter case, the original foreground field is effectively discarded and the character or symbol appears as a light 'hole' in the 'dark' background field.

Figure 8A:
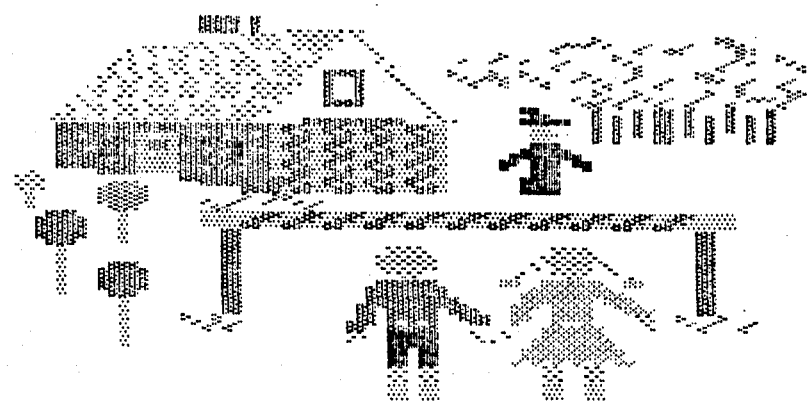
Figure 8B:
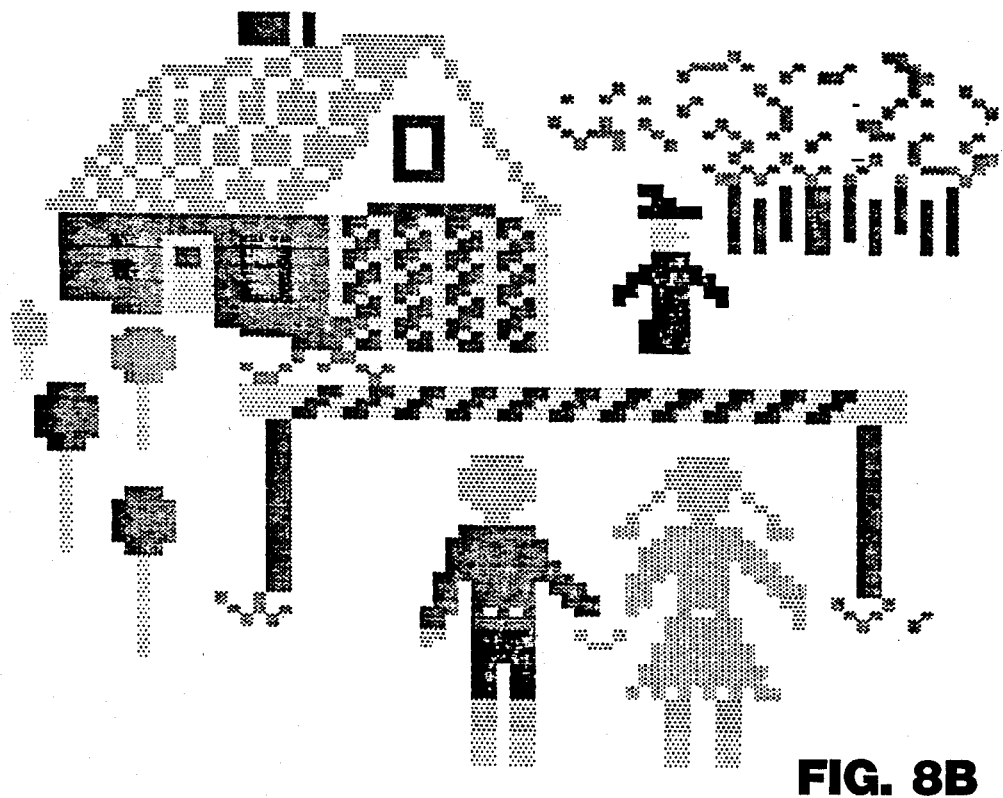
Figure 8C:
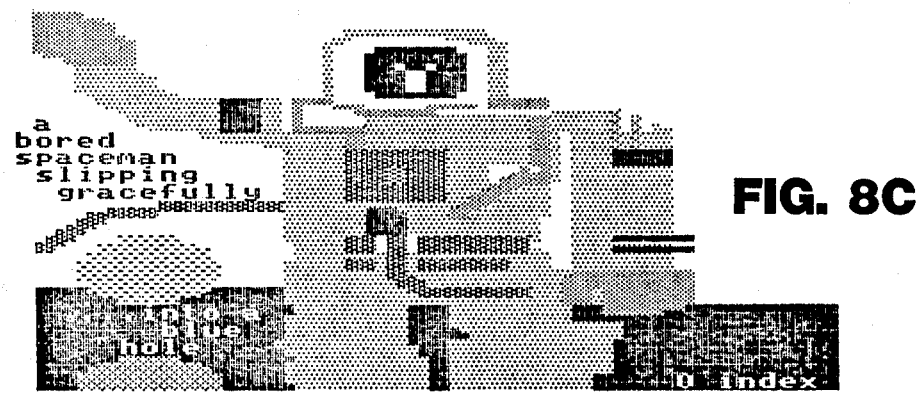

Finally, the color to monochromatic image transformation method of the present invention, including the enhancement of alphanumeric characters or symbols, is illustrated by FIGS. 8A, 8B and 8C. FIGS. 8A, 8B and 8C present images, including both graphic and alphanumeric characters, originally generated in a color system, specifically PRESTEL, and subsequently transformed and printed using the method and apparatus of the present invention in a System 10 of the present example. FIG. 8A presents an image using 8 by 8 dot color pattern masks while FIG. 8B presents the same image using 20 by 16 dot color pattern masks. FIG. 8C presents a different image using 8 by 8 dot color pattern masks and including enhanced alphanumeric characters.

It will be apparent to those of ordinary skill in the art that the present invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for transforming a color image into a monochromatic image, the color image being comprised of a plurality of areas each having a color, comprising the steps of:
   (A) providing a plurality of color pattern masks, each color pattern mask being associated with a color, and each color pattern mask representing a dot pattern comprised of a rectangular array of light and dark dots as follows
   (1) in a mask for the color black
      i. the even numbered rows of the array are comprised of one or more repetitions of the dot pattern 0000 and
      ii. the odd numbered rows of the array are comprised of one or more repetitions of the dot pattern 0000,
   (2) in a mask for the color red
      i. the even numbered rows of the array are comprised of one or more repetitions of the dot pattern 1011 and
      ii. the odd numbered rows of the array are comprised of one or more repetitions of the dot pattern 1110,
   (3) in a mask for the color green
      i. the even numbered rows of the array are comprised of one or more repetitions of the dot pattern 1100 and
      ii. the odd numbered rows of the array are comprised of one or more repetitions of the dot pattern 0011,
   (4) in a mask for the color yellow
      i. the even numbered rows of the array are comprised of one or more repetitions of the dot pattern 1100 and
      ii. the odd numbered rows of the array are comprised of one or more repetitions of the dot pattern 0000,
   (5) in a mask for the color blue
      i. the even numbered rows of the array are comprised of one or more repetitions of the dot pattern 1111 and
      ii. the odd numbered rows of the array are comprised of one or more repetitions of the dot pattern 1111,
   (6) in a mask for the color magenta
      i. the even numbered rows of the array are comprised of one or more repetitions of the dot pattern 1010 and
      ii. the odd numbered rows of the array are comprised of one or more repetitions of the dot pattern 0101,
   (7) in a mask for the color cyan
      i. the even numbered rows of the array are comprised of one or more repetitions of the dot pattern 1010 and
      ii. the odd numbered rows of the array are comprised of one or more repetitions of the dot pattern 0001, and
   (8) in a mask for the color white
      i. the even numbered rows of the array are comprised of one or more repetitions of the dot pattern 1010 and
      ii. the odd numbered rows of the array are comprised of one or more repetitions of the dot pattern 0000,
   and for each area of the color image
   (B) generating a character mask representing the area, and
   (C) combining the character mask and the color pattern mask associated with the color of the area so as to replace each colored area with the dot pattern associated with the color of the area.

2. The method of claim 1, wherein the patterns for the even numbered rows are aligned with the patterns for the odd numbered rows such that the first dot of the odd row dot patterns are aligned with the first dot of the even row dot patterns except as follows:
   (a) in the masks for yellow and cyan, the dot patterns in half of the even numbered rows are shifted two dot positions with the respect to the dot patterns in the other half of the even numbered rows, and (b) in the mask for white, the dot patterns in half of the even numbered rows are shifted one dot positions with respect to the dot patterns in the other half of the even numbered rows.

3. A method for transforming a color image into a monochromatic image, the color image being comprised of a plurality of areas each having a color, comprising the steps of:
(A) providing a plurality of color pattern masks, each color pattern mask being associated with a color, and each color pattern mask representing a dot pattern comprised of a rectangular array of light and dark dots as follows
  (1) in a mask for the color black
    i. the even numbered rows of the array are comprised of one or more repetitions of the dot pattern 0000 and
    ii. the odd numbered rows of the array are comprised of one or more repetitions of the dot pattern 0000,
  (2) in a mask for the color red
    i. the even numbered rows of the array are comprised of one or more repetitions of the dot pattern 1011 and
    ii. the odd numbered rows of the array are comprised of one of more repetitions of the dot pattern 1110,
  (3) in a mask for the color green
    i. the even numbered rows of the array are comprised of one or more repetitions of the dot pattern 11001100110011011100 and
    ii. the odd numbered rows of the array are comprised of one or more repetitions of the dot pattern 0011,
  (4) in a mask for the color yellow
    i. the even numbered rows of the array are comprised of one or more repetitions of the dot pattern 1001 and
    ii. the odd numbered rows of the array are comprised of one or more repetitions of the dot pattern 0000,
  (5) in a mask for the color blue
    i. the even numbered rows of the array are comprised of one or more repetitions of the dot pattern 1111 and
    ii. the odd numbered rows of the array are comprised of one or more repetitions of the dot pattern 1111,
  (6) in a mask for color magenta
    i. the even numbered rows of the array are comprised of one or more repetitions of the dot pattern 1011 and
    ii. the odd numbered rows of the array are comprised of one or more repetitions of the dot pattern 0100,
  (7) in a mask for the color cyan
    i. the even numbered rows of the array are comprised of one or more repetitions of the dot pattern 10001 and
    ii. the odd numbered rows of the array are comprised of one or more repetitions of the dot pattern 00100 and
  (8) in a mask for the color white
    i. the even numbered rows of the array are comprised of one or more repetitions of the dot pattern 1000 and
    ii. the odd numbered rows of the array are comprised of one or more repetitions of the dot pattern 0000,
and for each area of the color image
(B) generating a character mask representing the area, and
(C) combining the character mask and the color pattern mask associated with the color of the area so as to replace each colored area with the dot pattern associated with the color of the area.

4. The method of claim 3, wherein the patterns for the even numbered rows are aligned with the patterns for the odd numbered rows such that the first dot of the odd row dot patterns are aligned with the first dot of the even row dot patterns except as follows:
in the masks for yellow and white, the dot patterns in half of the even numbered rows are shifted two dot positions with respect to the dot patterns in the other half of the even numbered rows.

5. Means for transforming a color image into a monochromatic image, the color image being comprised of a plurality of areas each having a color, comprising:
(A) a plurality of color pattern masks, each color pattern mask being associated with a color, and each color pattern mask representing a dot pattern comprised of a rectangular array of light and dark dots as follows
  (1) in a mask for the color black
    i. the even numbered rows of the array are comprised of one or more repetitions of the dot pattern 0000 and
    ii. the odd numbered rows of the array are comprised of one or more repetitions of the dot pattern 0000,
  (2) in a mask for the color red
    i. the even numbered rows of the array are comprised of one or more repetitions of the dot pattern 1011 and
    ii. the odd numbered rows of the array are comprised of one or more repetitions of the dot pattern 1110,
  (3) in a mask for the color green
    i. the even numbered rows of the array are comprised of one or more repetitions of the dot pattern 1100 and
    ii. the odd numbered rows of the array are comprised of one or more repetitions of the dot pattern 0011,
  (4) in a mask for the color yellow
    i. the even numbered rows of the array are comprised of one or more repetitions of the dot pattern 1100 and
    ii. the odd numbered rows of the array are comprised of one or more repetitions of the dot pattern 0000,
  (5) in a mask for the color blue
    i. the even numbered rows of the array are comprised of one or more repetitions of the dot pattern 1111 and
    ii. the odd numbered rows of the array are comprised of one or more repetitions of the dot pattern 1111,
  (6) in a mask for the color magenta
    i. the even numbered rows of the array are comprised of one or more repetitions of the dot pattern 1010 and ii. the odd numbered rows of the array are comprised of one or more repetitions of the dot pattern 0101,
(7) in a mask for the color cyan
i. the even numbered rows of the array are comprised of one or more repetitions of the dot pattern 1010 and
ii. the odd numbered rows of the array are comprised of one or more repetitions of the dot pattern 0001, and
(8) in a mask for the color white
i. the even numbered rows of the array are comprised of one or more repetitions of the dot pattern 1010 and
ii. the odd numbered rows of the array are comprised of one or more repetitions of the dot pattern 0000,
(B) means for generating a character mask representing one of the colored areas of the color image, and
(C) means for combining the character mask and the color pattern mask associated with the color of the area represented by the character mask so as to replace the colored area with the dot pattern associated with the color of that area.

6. The means of claim 5, wherein the patterns for the even numbered rows are aligned with the patterns for the odd numbered rows such that the first dot of the odd row patterns are aligned with the first dot of the even row dot patterns except as follows:
(a) in the masks for yellow and cyan, the dot patterns in half of the even numbered rows are shifted two dot positions with respect to the dot patterns in the other half of the even numbered rows, and
(b) in the mask for white, the dot patterns in half of the even numbered rows are shifted one dot position with respect to the dot patterns in the other half of the even numbered rows.

7. Means for transforming a color image into a monochromatic image, the color image being comprised of a plurality of areas each having a color, comprising:
(A) a plurality of color pattern masks, each color pattern mask being associated with a color, and each color pattern mask representing a dot pattern comprised of a rectangular array of light and dark dots as follows
(1) in a mask for the color black
i. the even numbered rows of the array are comprised of one or more repetitions of the dot pattern 0000 and
ii. the odd numbered rows of the array are comprised of one or more repetitions of the dot pattern 0000,
(2) in a mask for the color red
i. the even numbered rows of the array are comprised of one or more repetitions of the dot pattern 1011 and
ii. the odd numbered rows of the array are comprised of one or more repetitions of the dot pattern 1110,
(3) in a mask for the color green
i. the even numbered rows of the array are comprised of one or more repetitions of the dot pattern 11001100110011011100 and
ii. the odd numbered rows of the array are comprised of one or more repetitions of the dot pattern 0011,
(4) in a mask for the color yellow
i. the even numbered rows of the array are comprised of one or more repetitions of the dot pattern 1001 and
ii. the odd numbered rows of the array are comprised of one or more repetitions of the dot pattern 0000,
(5) in a mask for the color blue
i. the even numbered rows of the array are comprised of one or more repetitions of the dot pattern 1111 and
ii. the odd numbered rows of the array are comprised of one or more repetitions of the dot pattern 1111,
(6) in a mask for the color magenta
i. the even numbered rows of the array are comprised of one or more repetitions of the dot pattern 1011 and
ii. the odd numbered rows of the array are comprised of one or more repetitions of the dot pattern 0100,
(7) in a mask for the color cyan
i. the even numbered rows of the array are comprised of one or more repetitions of the dot pattern 10001 and
ii. the odd numbered rows of the array are comprised of one or more repetitions of the dot pattern 00100 and
(8) in a mask for the color white
i. the even numbered rows of the array are comprised of one or more repetitions of the dot pattern 1000 and
ii. the odd numbered rows of the array are comprised of one or more repetitions of the dot pattern 0000,
(B) means for generating a character mask representing one of the colored areas of the color image, and
(C) means for combining the character mask and the color pattern mask associated with the color of the area represented by the character mask so as to replace the color area with the dot pattern associated with the color of that area.

8. The means of claim 7, wherein the patterns for the even numbered rows are aligned with the patterns for the odd numbered rows such that the first dot of the odd row dot patterns are aligned with the first dot of the even row dot patterns except as follows:
in the masks for yellow and white, the dot patterns in half of the even numbered rows are shifted two dot positions with respect to the dot patterns in the other half of the even numbered rows.

* * * * *